SAMUEL H. HINSDELLS
IMPROVED
MORTAR MILL

No. 117,540.

PATENTED AUG. 1 1871

WITNESSES
C. W. Smith
H. Sprague

S. H. Hinsdell
INVENTOR 117,540

UNITED STATES PATENT OFFICE.

SAMUEL H. HINSDELL, OF CAMILLUS, NEW YORK.

IMPROVEMENT IN MORTAR-MACHINES.

Specification forming part of Letters Patent No. 117,540, dated August 1, 1871; antedated July 18, 1871.

*To all whom it may concern:*

Be it known that I, SAMUEL H. HINSDELL, of the town of Camillus, in the county of Onondaga and State of New York, have invented a new and Improved Mortar-Machine; and I do hereby declare that the following is a full, clear, and exact description of the same, reference being had to the accompanying drawing and to the letters of reference thereon, which form a part of this specification, and in which the letters represent corresponding parts wherever they occur.

Figure 1:
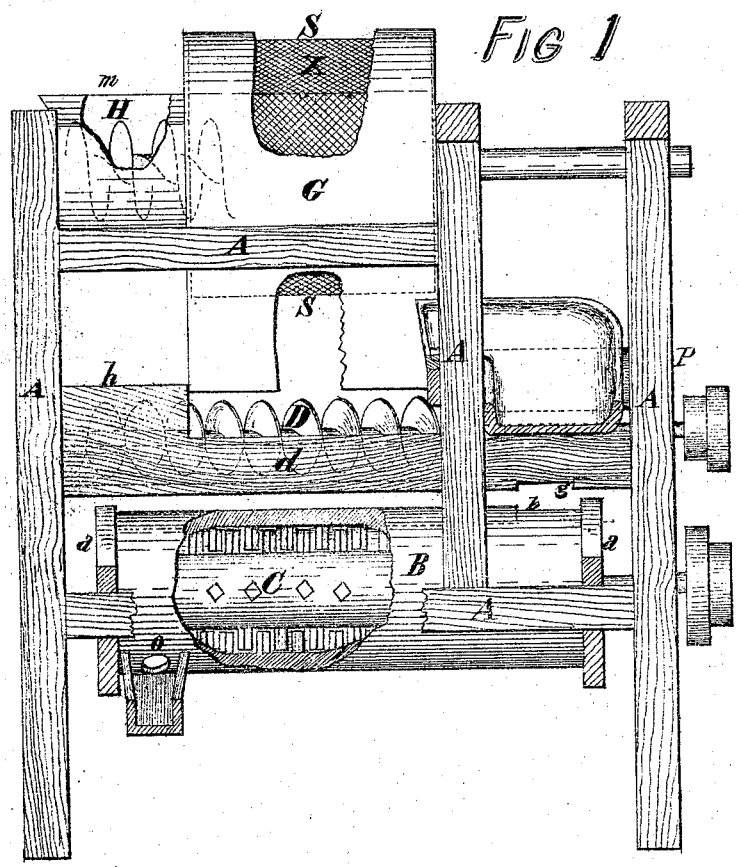
Figure 2:
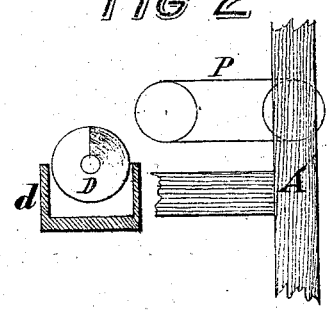

Figure 1 represents a side view of the machine with open sections, showing the internal arrangements. Fig. 2 represents a partial end elevation, showing the endless apron and trough.

The whole may be made of wood or other suitable material, except where metal is particularly referred to as preferable.

A is a frame to the whole machine, which will vary somewhat in size and form to accommodate the size and locality of the several parts of the machine. B is a cylindrical box, in which the principal part of the mixing operation is performed, and made to rest upon the frame A by means of supports $a$ $a$. I make the box about three feet long, more or less, and about twelve to fifteen inches in diameter, and armed with teeth set to mesh with the teeth upon the cylinder, so that in such mesh they will not leave a space of more than from a fourth to a sixth of an inch, so that any lumps that pass into the cylinder may be ground fine. The teeth should be made of iron or other hard substance, to bear the strain. In the extreme end of the box is an opening, O, for a discharge-pipe to carry off the mixed mortar. Properly fitting into the cylindrical box B, and resting on the frame A, by suitable journals in ordinary form, is the cylinder C, in the form of an enlarged shaft, about eight to ten inches in diameter, armed with teeth in the same manner as the cylindrical box B, which mesh with the teeth in the box as above stated.

The materials for the mortar are fed into the box at the point $b$, and the same is done by means of the conveyer D, as shown in the drawing. The conveyer D is in screw form, and rests in journals upon the frame A, and operates in the trough $d$ with a spiral motion, to carry forward the materials and partially assists the mixing. A hopper, $h$, in suitable form, is so arranged at the end of the trough $d$ that a part of the conveyer D will operate at the bottom of it and receive and carry forward the materials when fed at that point. At the extreme end of the trough $d$ is an opening, $g$, for the discharge of the materials into the cylindrical box B. Water may be added at either or both ends of the conveyer D, as may be necessary. I also make a screen, S, in any ordinary form, resting on journals which have their bearing in the frame A, and fed by means of a short conveyer, H, attached to the same shaft upon which the screen is operated, and operating in a hopper and trough, $m$, substantially as shown in the drawing. The screen-covering X is made of wire, six meshes to the inch, more or less, and supported upon the shaft by spider-arms and frame-work in any ordinary manner. G is a covering which operates to keep the dust from flying, and gather the materials into the trough $d$. P is an endless apron placed near the feeding-in end of the cylindrical box B, and used for the purpose of carrying forward the hair when used in the mortar.

My machine, taken together, contemplates the following method or process for making mortar ready for use as it comes from the machine: I air or dry-slake the lime in any ordinary manner, and mix it with the sand in a dry state in the proportion desired, and then feed the dry mixture into the hopper $m$, when the short conveyer H carries it into the screen S. By mixing the dry lime with the sand it operates to dry the sand and make it capable of being screened more perfectly than when wet. The operation of the screen S is to thoroughly mix the lime and sand and free them from dregs. The mixed compound falls into the trough $d$, where it is carried forward to be dropped into the cylindrical box B, and in which trough the application of water will be commenced if desired; and when hair is added, that will be supplied at the head of the trough $d$. If more water be desired, let it be added at the feeding-in end of the box B. The whole compound is then subjected to a rapid motion of the cylinder C in the cylindrical box B, where the mixing and grinding are completed. The cylinder C should be made to revolve two hundred and fifty times, more or less, to the minute. The whole must be supplied with the necessary belting or gearing, and may be operated with power in any ordinary manner.

What I claim as my invention, and desire to secure by Letters Patent, is—

1. The mortar-mill, composed of the screen S, conveyer D, cylindrical box B, and cylinder C, constructed, arranged, and operating as described, and provided with feeding, connecting, and discharging devices, as set forth.

2. The process of making mortar by machinery, substantially in the manner above set forth.

S. H. HINSDELL.

Witnesses:
C. W. SMITH,
H. SPRAGUE.